United States Patent [19]

Wetsel, Jr.

[11] 4,007,462
[45] Feb. 8, 1977

[54] LIGHT ABSORPTION PRINTING PROCESS
[75] Inventor: Grover C. Wetsel, Jr., Richardson, Tex.
[73] Assignee: Recognition Equipment Incorporated, Dallas, Tex.
[22] Filed: Dec. 24, 1975
[21] Appl. No.: 644,104
[52] U.S. Cl. ............................ 346/1; 235/61.12 N; 250/458; 427/157
[51] Int. Cl.² ...................................... G01D 15/34
[58] Field of Search ............... 346/76 L, 108, 107, 346/1; 250/459, 458, 461; 427/53, 157, 158; 235/61.12 N; 96/82

[56]  References Cited
UNITED STATES PATENTS

| 3,105,908 | 10/1963 | Burkhardt | 250/461 X |
| 3,266,393 | 8/1966 | Chitayat | 346/107 X |
| 3,303,341 | 2/1967 | Fram et al. | 250/458 |
| 3,477,850 | 11/1969 | Berman | 96/48 |
| 3,609,694 | 9/1971 | Brenner | 340/172.5 |
| 3,723,121 | 3/1973 | Hauser | 96/27 |
| 3,803,637 | 4/1974 | Martin et al. | 346/76 L |

Primary Examiner—Joseph W. Hartary
Attorney, Agent, or Firm—John E. Vandigriff

[57] ABSTRACT

A method and system for recording information on a document surface to accommodate the automatic processing of documents is provided, which requires neither ink jet nor impact printing. A photosensitive material, such as a dye, is applied as a continuous coat over a field of the document surface. Selected locations within the field thereafter are irradiated with a light beam. The light beam is of an intensity and wavelength to effect a change in the light emitting properties of the photosensitive material at the selected locations. Either alphanumeric or bar encoded information may be recorded thereby on a document surface for subsequent detection by an optical reader.

10 Claims, 3 Drawing Figures

LIGHT ABSORPTION PRINTING PROCESS

FIELD OF THE INVENTION

This invention relates to the recording of information on document surfaces as they move at known velocities through a processing station, and more particularly, to the recording of information by irradiating selected areas of a photosensitive material applied as a continuous field on a document surface.

PRIOR ART

Ink jet and impact printing systems have been used heretofore to print information upon document surfaces. Ink jet printer systems are used extensively to record information not only in bar code form, but also as alphanumerics on document surfaces. Both ink jet and impact printing systems are characterized by the application of a pattern of material to a document surface, such material being detectable by a reading system.

To accommodate the automatic processing of information printed on documents, information otherwise available in alphanumeric form is often applied to documents in bar code form. Bar codes facilitate the reading of information with less exotic systems than are necessary in interpreting information in the alphanumeric form. Such a bar code system has been disclosed in U.S. Pat. No. 3,703,628 to Philipson. In U.S. Pat. No. 3,596,276 to Lovelady, the problems associated with laying down bar codes with ink jet printers are portrayed.

In the capture of information printed on a document surface, an optical sensor of a reading system generates an information signal when the printed information is passed through registration with the sensor. The information signal thereafter is operated upon to detect the presence of alphanumerics or encoded data formats.

Many documents such as bank checks have data field overprints caused by stamped legends, endorsements and the like. The existence of such overprints reduces the reliability of a reading system. In order to avoid such overprint problems, fluorescent dyes have been used in ink jet printers so that a better optical contrast between the printed information and the data field background can be realized. Significant problems, however, still remain. Background discontinuities caused by luminescing inks, differing paper types and surface color variations contribute substantially to the level of noise in a sensor generated signal.

The present invention is directed to a system wherein a field of photosensitive material is applied to a document surface, and irradiated by precisely controlled pulses of light to effect the alteration of the light emitting properties of selected locations of an otherwise continuous data field. Either alphanumeric or bar encoded information thereby may be printed on a document surface substantially free of background discontinuities.

SUMMARY OF THE INVENTION

The present invention involves the application of a continuous coating to a document surface of a material which will undergo phototransformation of the light emitting properties thereof upon irradiation thereof by an intense light beam. The light emitting properties of selected areas of the coating are then altered by selective localized absorption of light.

In accordance with one aspect of the invention, a stream of documents is moved through an encoding station at a predetermined velocity. At a first location a strip of dye is applied to a face of the document as each document moves through the station, the dye having a predetermined light emitting characteristic. At a second location downstream of the first location, at least a part of the strip is selectively irradiated with time-space-coded light pulses of appropriate intensity and wavelength to physically alter the light emitting properties of the strip. A space-coded set of altered strip areas thereby is produced.

DESCRIPTION OF THE DRAWINGS

The novel features believed characteristic of the invention are set forth in the appended claims. The invention itself, however, as well as further objects and advantages thereof, will best be understood by reference to the following detailed description of illustrative embodiments taken in conjunction with the accompanying drawings, in which:

DESCRIPTION OF PREFERRED EMBODIMENTS

Figure 1:
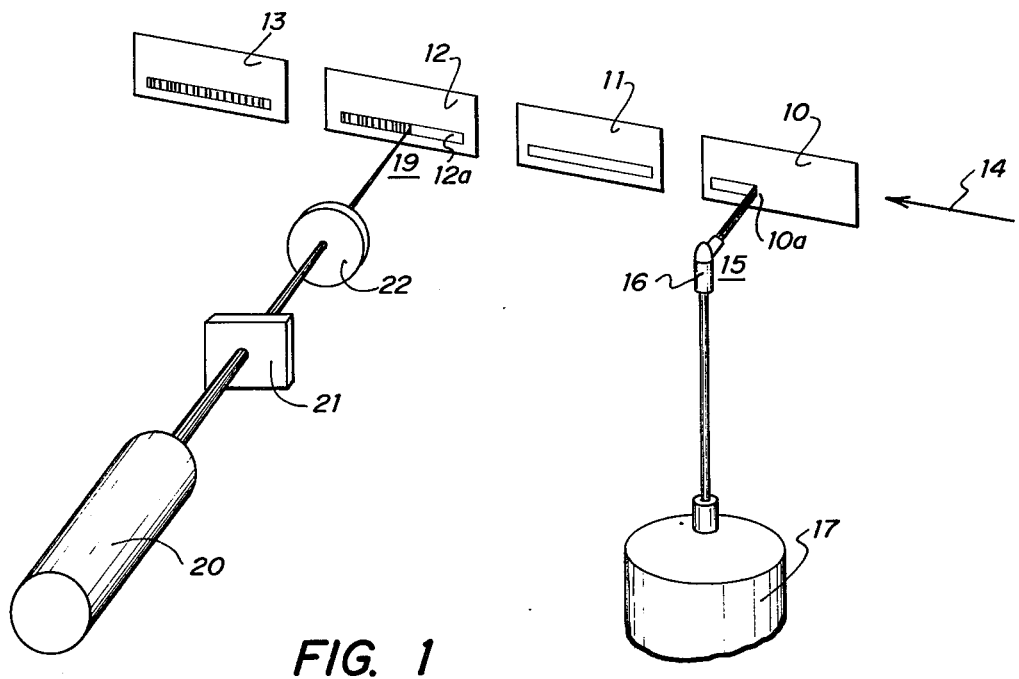
FIG. 1 illustrates diagrammatically a system embodying the present invention.

FIG. 1 illustrates a train of documents 10–13 moving in the direction of arrow 14 through a data processing station. The documents may be bank checks or other documents having information printed thereon to facilitate further processing of the documents.

As the documents are moved by a conveyor system (not shown) past a spray station 15, a continuous band of a photosensitive material such as a dye is sprayed onto the surface of each of the documents by a spray nozzle 16 supplied from a pressurized source 17. A uniform band of dye 12a thereby is applied to document 12, as are similar bands to documents 11 and 13. Document 10 is shown in the process of receiving a band of dye 10a.

At a station 19 downstream of the spray station 15, an optical system is provided in which selected areas within the band 12a may be irradiated by light from a suitable light source 20, such as an argon-ion laser manufactured and sold by Spectra Physics Incorporated of Mountain View, California, and identified to the public as Model Number 170. A beam of light from the laser passes through an acousto-optic light modulator 21 to a spherical lens 22. The spherical lens is focused to an area of diameter equal to a bar width. The modulator 21 is electrically opened and closed to permit the light to imping at selected points along band 12a. When modulator 21 is open, the beam of light is also deflected by the modulator in a direction diagonal to the document path to form a vertical bar in band 12a.

Modulator 21 may be of a type manufactured and sold by the FJW Corporation of Mount Prospect, Illinois, and identified as Model Number D4OR. The selection of lens 22 is determined by the desired bar area to which a beam of light is to be focused. The spacing between bars is controlled by the speed of the documents and the duty cycle of modulator 21.

It has been found that when a document surface area having coated thereon a band of magenta dye of the type manufactured and sold by Day-Glo Color Corporation of Cleveland, Ohio, and identified as strong magenta, is subjected to a focused light beam of suitable wavelength and energy density, a physical change occurs in such surface area which contrasts significantly with the remainder of the band. The dye undergoes phototransformation of the light emitting properties upon irradiation thereof by an intense beam of light of requisite wave length. There are a number of dyes which provide a similar effect. Suitable dyes include, by way of example and not limitation, BLAZE ORANGE, STRONG MEGENTA, STRONG RED and STRONG YELLOW dyes manufactured by Day-Glo Color Corporation. The dyes are mixtures of four component dyes of the class called BASIC and are of type FLUORESCENT and are mixed with a suitable solvent, such as Solvent M-102 manufactured and sold by John B. Moore Company, S. Amboy, New Jersey.

It further has been found that when a document is coated with a band of such dye and irradiated with focused light in the wavelength range of 457.9 to 514.5 nanometers from a light source having an output power of approximately ¾ watts, and such irradiation occurs for a time period of the order of 0.01 second, the light emission properties of an area of approximately $2.8 \times 10^{-5}$ square inches may be detectably altered. Such results were achieved with an argon-ion laser operating in conjunction with a camera-type lens shutter assembly. The laser is manufactured and sold by the Coherent Radiation Laboratories of Palo Alto, California, and identified as Model Number 50. The shutter assembly is manufactured and sold by the Eastman Kodak Company of Rochester, New York, and identified as Model Number 26800 with F/6.3, 83 millimeter lens system.

The extent to which the light emission properties of a dye-coated area may be altered is dependent upon the dye used, the output power and wavelength of the light source, the exposure time, and the cross-sectional area of the light beam. It logically may be extrapolated, however, that to achieve transport speeds in the order of 200 inches/second, an exposure period of approximately 148 microseconds is required. Within such a time period, a bar area of approximately 0.008 inches by 0.001 inches may be formed by an optical system providing an optical energy density of about 280 joules per square inch in response to a light source having an output power of the order of 15 watts. The before described laser manufactured and sold by Spectra Physics Incorporated is suitable for use with such a 200 inch/second transport. Such a laser has a wavelength range of 457.9 to 514.5 nanometers and an output power of the order of 15 watts. With slower transport speeds, the bar size may be enlarged and the laser power reduced. Optimal matching of light source with dyes may further reduce the power requirements.

Figure 2:
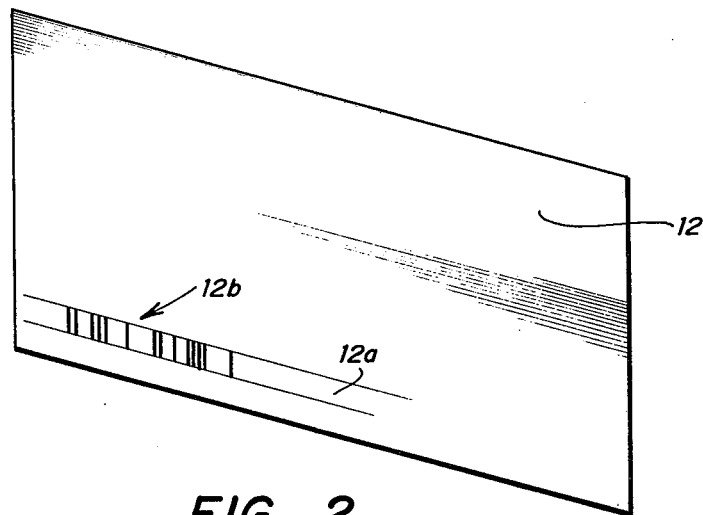
FIG. 2 is an enlarged view of one of the documents of FIG. 1.

An enlarged view of document 12 is illustrated in FIG. 2, where a phase-modulated bar-encoded data field 12b has been formed in band 12a. Each bar of data field 12b is a manifestation of a change in light emitting properties, which is detectable by a bar-code reading system. Such change was effected by the absorption of light emitted by light source 20.

Figure 3:
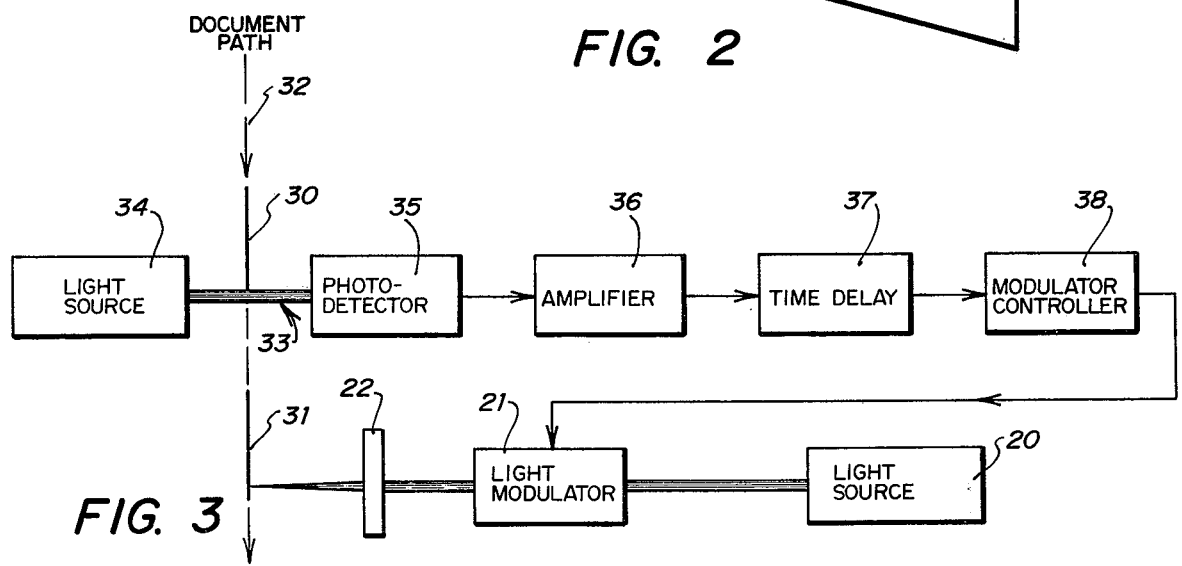
FIG. 3 is a functional block diagram of a document tracking and print control system for the system of FIG. 1.

FIG. 3 illustrates in functional block diagram form a document tracking and print control system for synchronizing the travel of documents with the printing of bars as disclosed herein.

After a coat of dye is sprayed onto documents 30 and 31, a conveyor system transports the documents in the direction indicated by arrow 32. A beam of light 33 from a light source 34 is sensed by a photodetector 35. When document 30 interrupts the light beam, detector 35 generates a signal which is amplified by amplifier 36. A time-delay circuit 37 delays the amplified signal for a period of time determined by the transport velocity, and by the distance between the photodetector 35 and a writing station as indicated by the position of document 31. At the end of the delay period, the amplified signal at the output of amplifier 36 is applied to the input of a modulator controller 38. Controller 38 in turn issues a print command to modulator 21. Modulator 21 alternately opens and closes in response to commands from controller 38 to effect either a bar-no-bar or phase modulation in the printing of bars.

In accordance with the invention, there is provided a process and system for printing information upon a document surface having applied thereto a continuous coat of dye. More particularly, a focused light beam irradiates selected areas of the coated document to effect a physical change. The corresponding change in the light emission properties of the selected areas so irradiated is detectable by an optical reading system.

Having described the invention in connection with certain specific embodiments thereof, it is to be understood that further modifications may now suggest themselves to those skilled in the art. For example, the invention as herein disclosed may, with obvious modifications, be applied to the printing of alphanumerics. Further, the noise created by fluorescing dyes emitting light in the visible range may be obviated by substituting infrared fluorescing dyes. In addition, where a dye of increased sensitivity is employed or sufficient laser power is available, a cylindrical lens may replace spherical lens 22 and an electro-optic shutter may replace modulator 21. The cylindrical lens focuses a light beam to a full bar area, while the shutter is operated to alternately interrupt or pass the light beam. It is intended to cover such modifications as fall within the scope of the appended claims.

What is claimed is:

1. A method of recording information on a document surface, which comprises:
    a. applying a continuous coat over a field on said document of a fluorescent dye which will undergo a permanent phototransformation of the light emitting properties thereof by intense light radiation thereon; and
    b. irradiating limited information dependent locations within said field with a light beam of intensity and wavelength required to permanently change said light emitting properties of only said dye at said locations.

2. The method set forth in claim 1 wherein said dye is selected from the group of fluorescent dyes consisting of strong magenta, blaze orange, strong red, and strong yellow.

3. The method set forth in claim 2 wherein said light beam is in the wavelength range of 457.9 to 514.5 nanometers.

4. In an information system, the method which comprises:
    a. moving a stream of documents through an encoding station at a predetermined velocity;

b. as said documents move through a first station, laying down on a face of each of said documents a fluorescent strip of material which will undergo a permanent phototransformation of the light emitting properties thereof upon intense radiation of light thereon and having predetermined normal light emitting properties; and c. at a second station downstream of said first station, selectively irradiating limited spaced fields within said strip with time-space-coded light pulses of intensity and wavelength required to permanently physically alter said light emitting properties, thereby producing on said strip a space coded set of areas of altered light emitting properties.

5. The method set forth in claim 4 wherein said photosensitive material is a fluorescent dye selected from the group consisting of strong magenta, blaze orange, strong red, and strong yellow.

6. The method set forth in claim 5 wherein said wavelength is between 457.9 and 514.5 nanometers.

7. In a system for printing information on a document surface including a transport system for moving a train of documents past a print station, the combination which comprises:

a. at a first station means for applying to said document surface a substantially uniform layer of a fluorescent material which will undergo phototransformation of the light emitting properties thereof upon intense radiation of light thereon;

b. at said print station downstream from said first station a light generating means for producing a beam of light of intensity and wavelength required to effect said transformation in said light emitting properties of said material;

c. light modulating means operating upon said beam for controlling the duty cycle of said beam; and d. focusing means responsive to light from said modulating means for irradiating selected areas of said substantially uniform layer.

8. The combination set forth in claim 7 wherein said photosensitive material is a fluorescent dye selected from the group consisting of strong magenta, blaze orange, strong red, and strong yellow.

9. The combination set forth in claim 8 wherein said light generating means is a laser emitting a beam of light in the wavelength range of 457.9 to 514.5 nanometers.

10. The combination set forth in claim 9 wherein said light modulating means is of the light deflecting acousto-optic type and said focusing means is a spherical lens.

* * * * *